United States Patent
Harada et al.

(10) Patent No.: US 7,648,537 B2
(45) Date of Patent: Jan. 19, 2010

(54) RECHARGEABLE BATTERY AND METHOD FOR FABRICATING THE SAME

(75) Inventors: Koichi Harada, Tokyo (JP); Hiroki Inagaki, Kanagawa (JP); Seiichi Suenaga, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 456 days.

(21) Appl. No.: 11/233,184

(22) Filed: Sep. 23, 2005

(65) Prior Publication Data

US 2006/0073388 A1  Apr. 6, 2006

(30) Foreign Application Priority Data

Oct. 1, 2004  (JP)  ............... 2004-289946

(51) Int. Cl.
*H01M 4/82* (2006.01)
*H01M 6/00* (2006.01)
*H01M 10/00* (2006.01)
*H01M 4/02* (2006.01)

(52) U.S. Cl. .............. 29/623.1; 429/122; 429/209

(58) Field of Classification Search ............... None
See application file for complete search history.

(56) References Cited

U.S. PATENT DOCUMENTS

| | | | |
|---|---|---|---|
| 5,405,718 A * | 4/1995 | Hashemi | 429/304 |
| 7,094,500 B2 | 8/2006 | Ugaji et al. | |
| 2003/0082446 A1 | 5/2003 | Chiang et al. | |
| 2003/0232248 A1 * | 12/2003 | Iwamoto et al. | 429/233 |
| 2004/0033419 A1 * | 2/2004 | Funabiki | 429/218.1 |
| 2004/0185336 A1 | 9/2004 | Ito et al. | |

FOREIGN PATENT DOCUMENTS

| | | |
|---|---|---|
| JP | 60-220507 | 11/1985 |
| JP | 6-243739 | 9/1994 |
| JP | 10-83838 | 3/1998 |
| JP | 10-308222 | 11/1998 |
| JP | 2000-106366 | 4/2000 |
| JP | 2003-217574 | 7/2003 |
| JP | 2004-71305 | 3/2004 |
| JP | 2004-87209 | 3/2004 |
| JP | 2004-127743 | 4/2004 |
| JP | 2004-525481 | 8/2004 |
| JP | 2004-273436 | 9/2004 |
| JP | 2005-251417 | 9/2005 |
| WO | WO 02/089236 A1 | 11/2002 |

* cited by examiner

*Primary Examiner*—Dah-Wei D Yuan
*Assistant Examiner*—Steven Scully
(74) *Attorney, Agent, or Firm*—Oblon, Spivak, McClelland, Maier & Neustadt, L.L.P.

(57) ABSTRACT

An inorganic solid electrolytic rechargeable battery capable of offering excellent battery characteristics is disclosed. The battery has positive and negative electrodes and an inorganic electrolyte interposed therebetween. The positive and negative electrodes are each made up of an active material layer and a current collector layer. The positive electrode collector layer or the negative electrode collector layer is a conductive metal oxide layer. The negative electrode active material layer is made of lithium metals or lithium alloys. This negative active layer may alternatively be made of a material which causes an operation voltage potential of the negative electrode to become more noble than 1.0 V with respect to the potential of a metallic lithium. A complexity-reduced fabrication method of the rechargeable battery is also disclosed.

10 Claims, 2 Drawing Sheets

RECHARGEABLE BATTERY AND METHOD FOR FABRICATING THE SAME

CROSS-REFERENCE TO RELATED APPLICATION

This application is based upon and claims the benefit of priority from the prior Japanese Patent Application No. 2004-289946, filed on Oct. 1, 2004, the entire contents of which are incorporated herein by reference.

BACKGROUND OF THE INVENTION

1. Field of the Invention

The present invention relates to a rechargeable battery using an inorganic solid electrolyte and a fabrication method thereof.

2. Related Art

As the quest grows for downsizing and weight-saving of electronic equipment, electrochemical storage battery cells also are more strongly demanded to satisfy such small-size/light-weight requirements. To achieve a battery which fully meets these requirements, ultra-small and ultra-thin batteries are under consideration, which are evolved from the integration or "collaboration" of thin-film architectures and battery material technologies. These thickness-reduced or "slim" batteries are expected to be used as power sources for integrated circuit (IC) cards and IC tags or to be mounted on large-scale integration (LSI) chip substrates.

On the other hand, high-power rechargeable batteries have been brought into practical use, including currently available lithium-ion rechargeable or secondary batteries having in combination a positive electrode made of lithium cobaltate, a negative electrode made of carbon material, and an electrolysis solution with lithium salts being dissolved in a nonaqueous solvent. While these are manufactured by various methods, one major approach for reduction to practice is to employ a process which includes the steps of depositing positive and negative electrode materials as slurried respectively, dehydrating resultant layers or membranes, cutting or "dicing" them into portions of a prespecified shape, rolling them under pressure, winding, and injecting thereinto an electrolysis solution. Unfortunately, such prior known methodology having these steps is encountered with limits to battery thinning and miniaturization.

Consequentially, in order to make batteries smaller and thinner, a low-profile solid-state electrolyte secondary battery has been proposed, which has its negative electrode made of metallic lithium or carbon, a positive electrode made of $LiCoO_2$ or $LiMn_2O_4$, and an electrolyte element made of inorganic solid electrolyte material. The battery of this type is manufacturable by using semiconductor processes, such as sputtering, deposition or else, in combination with patterning techniques. Some of such battery are disclosed, for example, in Published Unexamined Japanese Patent Application Nos. JP-A-2000-106366 and 2004-127743.

As the prior known solid electrolyte batteries are fabricated by thin-film fabrication processes, such as sputter techniques, these batteries suffer from problems as to an increase in time consumed for film fabrication, difficulty in film lamination, and an increase in production costs. Another problem faced with the prior art solid electrolyte batteries is that since these are often designed to employ for the electrolyte certain metals such as copper, aluminum, gold, palladium or other similar high-conductivity metals, any intended thermal processing after film fabrication is incapable of being sufficiently performed. This is a serious bar to the achievement of excellent crystallinity of active material, resulting in the battery characteristics becoming deficient and inacceptable for practical use.

BRIEF SUMMARY OF THE INVENTION

This invention has been made in view of the problems stated above, and its object is to provide a rechargeable battery which is manufacturable by simplified processes and which is excellent in battery characteristics and thus adaptable for miniaturization and thickness reduction, along with a method of making such rechargeable battery.

In accordance with a first aspect of the invention of the device category, a rechargeable battery—say, a "first" rechargeable battery—is provided which includes positive and negative electrodes and a solid electrolyte layer which contains lithium. The positive electrode has a positive active material layer and a positive current collector layer. The negative electrode has a negative active material layer, which is typically made of a metallic lithium or lithium alloy, and a negative collector layer. The inorganic solid electrolyte layer is interposed between the positive and negative electrodes. At least one of the positive and negative electrode collector layers is comprised of a conductive metal oxide.

In accordance with a second aspect of the device-category invention, a "second" rechargeable battery includes a positive electrode having a positive active material layer and a positive collector layer, and a negative electrode having a negative active material layer and a negative collector layer. The negative active material layer is comprised of a negative active material which causes an operation voltage potential of the negative electrode to become more noble than 1.0 volt (V) with respect to a potential of metallic lithium. The battery also includes a lithium-containing inorganic solid electrolyte which is laminated between the positive and negative electrodes. At least one of the positive and negative collector layers comprises a conductive metal oxide.

In accordance with a first aspect of the invention of the method category, a first rechargeable battery fabrication method is provided, which includes the steps of forming a multilayer structure having a sequential lamination of a positive electrode current collector layer, a positive electrode active material layer, a lithium-containing inorganic solid electrolyte layer and a negative electrode collector layer, sintering the multilayer structure in an oxidizable atmosphere, and performing, after the sintering, electrical charge-up of the multilayer structure to thereby create between the negative collector layer and the inorganic solid electrolyte layer a negative electrode active material layer which is made of either a metallic lithium or a lithium alloy. At least one of the positive and negative collector layers comprises a conductive metal oxide.

In accordance with a second aspect of the method-category invention, a second rechargeable battery fabrication method includes laminating a positive collector layer, a positive active material layer, a lithium-containing inorganic solid electrolyte layer, a negative active material layer and a negative collector layer to thereby obtain a multilayer structure thereof. The negative active material layer comprises a negative active material with an operation voltage potential of the negative electrode becoming more noble than 1.0V with respect to a potential of metallic lithium. The method also includes sintering the multilayer structure in an oxidizable atmosphere. At least one of the positive and negative collector layers comprises a conductive metal oxide.

An important feature of the first and second rechargeable batteries and the first and second fabrication methods of the invention is that a conductive metal oxide is used for either the positive electrode or the negative electrode current collector while using a specifically chosen negative electrode active material. This conductive metal oxide hardly exhibits any appreciable change in quality due to heating—in particular, heat application in oxidizable atmospheres. Thus it is possible to fabricate battery elements by use of currently available sintering techniques. In addition, owing to selection of the specific negative active material, the reversibility of absorption and release of lithium ions is excellent while retaining an extended cycle life of the battery.

According to the invention, it is possible to provide a rechargeable battery which is manufacturable by complexity-reduced methodology while offering excellent battery characteristics and thus is suitable for thin-shape designs.

DETAILED DESCRIPTION OF THE INVENTION

Intense studies are conducted by the inventors in terms of the preferred form of a secondary battery capable of being prepared by a simplified process without damaging the battery characteristics to reveal the fact which follows. When utilizing an inorganic solid electrolyte for the electrolyte and also using conductive metal oxides for either the positive electrode current collector or the negative electrode collector in combination with the co-use of a specific negative electrode active material, it becomes possible to obtain the intended rechargeable battery by sintering together those battery element precursors having the positive and negative electrodes and inorganic solid electrolyte. This makes it possible to prepare, at low costs, a small-size battery while reducing complexities in fabrication process and facility, when compared to prior known battery manufacturing methods using traditional film fabrication techniques, such as sputtering or else. It was also found that the obtained rechargeable battery's respective constituent members increase in density, resulting in each member exhibiting sufficient ion conduction property and electrical conductivity, thereby enabling obtainment of sufficiently enhanced battery characteristics.

Figure 1:
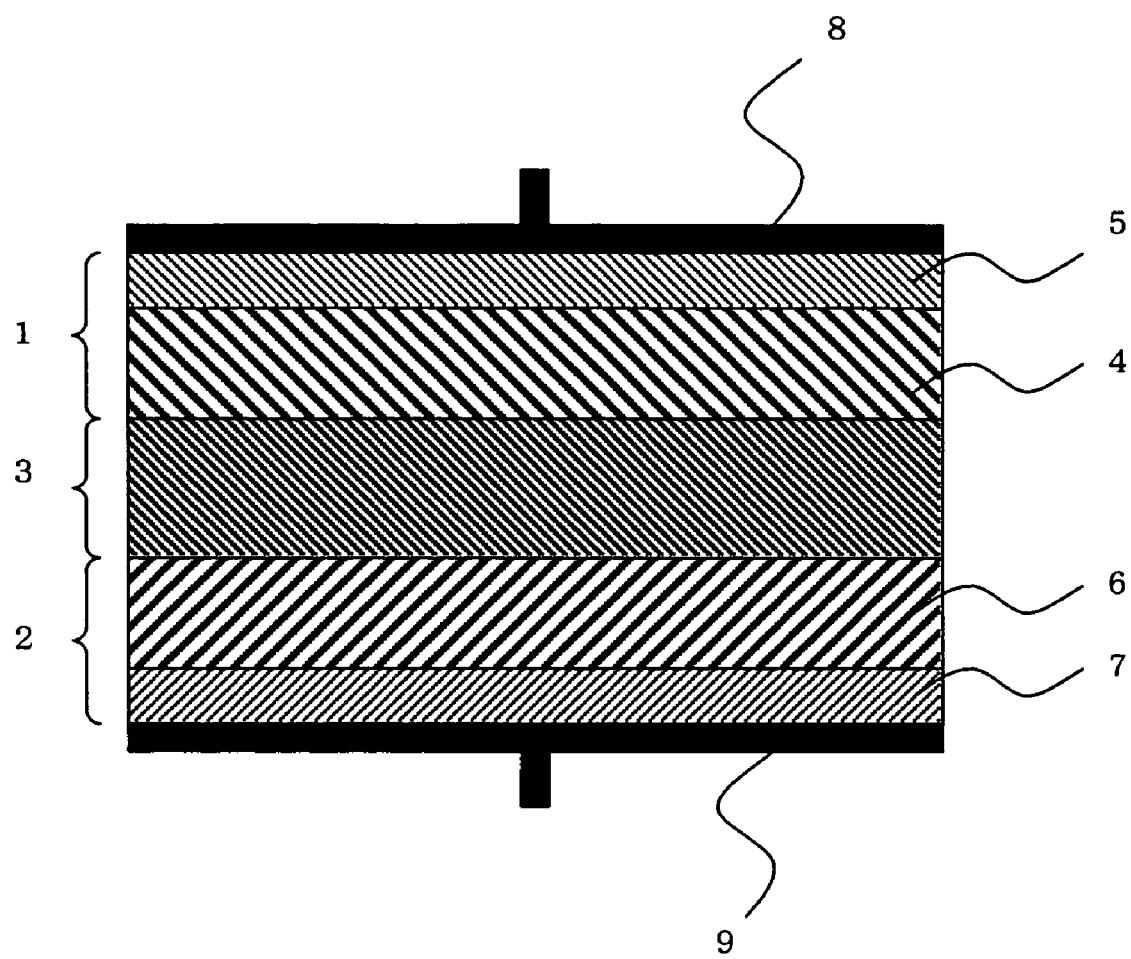
FIG. 1 is a diagram schematically showing a cross-sectional view of a rechargeable battery embodying the invention.

Referring to FIG. 1, a lithium-ion rechargeable or secondary battery in accordance with an embodiment of this invention is depicted in cross-section. Note that this illustrative embodiment incorporates the principal features of the first and second rechargeable batteries of the invention, which will be set forth in detail below.

An explanation will first be given of common structural features to the first and second rechargeable batteries.

As shown in FIG. 1, a battery cell is arranged to have a unitary multilayer structure of a positive electrode 1, a negative electrode 2 and an inorganic solid electrolyte layer 3. The positive and negative electrodes 1-2 oppose each other with the electrolyte layer 3 interposed therebetween. The positive electrode 1 has a positive electrode active material layer 4 and a positive electrode current collector layer 5, which are laminated on each other. The negative electrode 2 has a lamination of a negative electrode active material layer 6 and a negative collector layer 7. The inorganic solid electrolyte layer 3 is sandwiched between these positive and negative electrodes 1-2. Outer electrodes 8 and 9 having electrical wiring leads for deriving an output to external circuitry associated therewith are stacked on the positive and negative electrodes 1-2, respectively. The illustrative laminate structure is particularly adaptable for use as a thin or "slim" battery. The positive electrode active layer 4 is designed for example to have a thickness which preferably ranges from 500 to 0.1 micrometer ($\mu m$)—more preferably, 50 to 1 $\mu m$. The positive collector layer 5 preferably has a thickness of 500 to 0.1 $\mu m$, more preferably, 50 to 1 $\mu m$, The inorganic solid electrolyte layer 3 is preferably 500 to 0.1 $\mu m$ thick, more preferably 50 to 1 $\mu m$. The negative electrode active layer 6 has is preferably 500 to 0.1 $\mu m$ thick, more preferably, 50 to 1 $\mu m$. The negative electrode collector layer 7 is preferably 500 to 0.1 $\mu m$ thick, more preferably 50 to 1 $\mu m$. The positive electrode active material layer 4 of positive electrode 1 is arranged as follows. This positive active layer 4 may be made of various kinds of positive active materials including, but not limited to, metal oxides and metal sulfides. In particular, in case metal oxides are used, it becomes possible to perform the sintering of rechargeable battery in oxygen-containing atmospheres. This in turn makes it possible for resultant rechargeable batteries to obtain an active material that is less in oxygen defects and yet high in crystallinity. Thus, the use of metal oxides is desirable for fabrication of a large-capacity battery having its current capacity in close proximity to a theoretically expected capacity.

A practically employable example of the positive electrode active material is at least one kind of material as selected from the group consisting essentially of manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (e.g., $Li_xNiO_2$), Lithium-cobalt composite oxide ($Li_xCoO_2$), Lithium-nickel-cobalt composite oxide (e.g., $LiNi_{1-y}Co_yO_2$), lithium-manganese-cobalt composite oxide (e.g., $LiMn_yCo_{1-y}O_2$), spinel type lithium-manganese-nickel composite material ($Li_xMn_{2-y}Ni_yO_2$), lithium phosphorus oxide of the type having an olivine structure (such as $Li_xFePO_4$, $Li_xFe_{1-y}Mn_yPO_4$, $Li_xCoPO_4$ or else), iron sulfate ($Fe_2(SO_4)_3$), and vanadium oxide (e.g., $V_2O_5$). Note that the suffixes "x" and "y" as used in these chemical formulas are preferably determined fall within a range of 0 to 1.

More preferable examples of the positive active material are high battery voltage-attainable lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($Li_xNi_{1-y}Co_yO_2$), spinel type lithium manganese nickel composite oxide ($Li_xMn_{2-y}Ni_yO_4$), lithium manganese cobalt composite oxide ($Li_xMn_yCo_{1-y}O_2$), and lithium iron phosphate ($Li_xFePO_4$). Note that the suffixes x and y are preferably arranged to range from 0 to 1. These positive active materials are improved in crystallinity by sintering in oxidizable atmospheres, which leads to improvements in battery characteristics.

In regard to the positive electrode current collector layer 5 and negative electrode collector layer 7, at least one of these collector layers 5 and 7 used here is a conductive metal oxide layer. The conductive metal oxide layer refers to the one that has conductive metal oxides unified together into the form of a layer or membrane. This may also be a porous composition having in the layer ultrafine holes or voids. Using this material makes it possible to sinter all of the electrodes and electrolyte plus collectors at a time, thereby permitting resultant active materials to become higher in crystallinity. This further improves the electrical conductivities thereof. Thus, this approach is extremely suitable for obtaining excellent battery properties.

In cases where such conductive metal oxide is not used for either one of the positive and negative collector layers 5 and 7, it is permissible to use collector elements made of metals, such as copper or nickel, or metal alloys which hardly react with lithium ions at charge/discharge potentials of the negative electrode. However, this approach is not preferable because of the fact that such materials readily react with positive and negative active layers during high-temperature sintering after film formation, resulting in risks as to degradation of the battery characteristics. It is especially desirable to use conductive metal oxide layers for both the positive collector layer 5 and the negative collector layer 7.

The above-noted conductive metal oxide may typically be at least one kind of element as selected from the group consisting of tin (Sn), indium (In), zinc (Zn), and titanium (Ti). More specifically, $SnO_2$, $In_2O_3$, ZnO and $TiO_x$ (where x is greater than or equal to 0.5 and yet less than or equal to 2) may be good examples of the metal oxide. When a need arises, these conductive metal oxides may be designed to contain therein a limited amount—for example, 10 atomic percent (at %) or less—of conductivity enhancing elements, such as antimony (Sb), niobium (Nb), tantalum (Ta) or else.

Regarding the inorganic solid electrolyte layer 3, this layer may be made of a specific material that inherently has ionic conductivity and is negligibly less in electron conductivity. The inorganic solid electrolyte 3 is designed to contain lithium, so an ultimately obtained rechargeable battery is such that lithium ions act as movable ions. Preferable examples are $Li_3PO_4$, nitrogen-admixed $Li_3PO_4$ ($0<x\leq1$), lithium ion-conductible hyaline or vitreous solid electrolyte such as $Li_2S$—$SiS_2$, $Li_2S$—$P_2S_5$, $Li_2S$—$B_2S_3$ or else, and lithium ion-conductable solid electrolyte made of these vitreous materials doped with a lithium halide, such as LiI or else, and/or a lithium oxyacid, such as $Li_3PO_4$. These are effective because of their high lithium ion conductivities. Of these materials, lithium/titanium/oxygen-containing titanium oxide-based solid electrolyte—for example, $Li_xLa_y$-$TiO_3$ (where, $0<x<1$ and $0<y<1$) or the like—must be a preferable material because this exhibits stable performance even during sintering in oxygen gaseous atmospheres.

As for the outer electrodes 8-9, these may be made of known conductive materials; for example, silver (Ag), alloys of Ag and palladium (Pd), nickel (Ni)-plated or deposited copper (Cu), or equivalents thereto. Optionally, solder plating may be applied to outer electrode surfaces for parts mounting purposes. An electrical connection form of the outer electrodes 8-9 should not exclusively be limited to the one shown in FIG. 1, and may alternatively be arranged so that a battery structure having the positive and negative electrodes 1-2 and inorganic solid electrolyte layer 3 is covered or coated with resin material or else, while using lead wires for connection to portions of the positive and negative electrodes to derive outputs toward the outside.

It should be noted that main components of the secondary battery—i.e., the positive electrode 1, negative electrode 2 to be later discussed, inorganic solid electrolyte 3, and outer electrodes 8-9—may be modified to contain therein certain inorganic substance, such as for example $SiO_2$, $Al_2O_3$, PbO, MgO and others or, alternatively, contain organic substance such as polyvinyl-butyral (PVB), metyl-ethyl-ketone (MEK) or else.

Although in regard to the shape of rechargeable battery an exemplary secondary battery of the planar type having a multilayer of flat layer-shaped electrodes and electrolyte is shown in FIG. 1, the battery shape is not limited thereto. Other possible examples are batteries of the type having column- or rod-like shapes.

An explanation will next be given of an active material for use as the negative electrode active layer 6, which is not the common structural feature to the first and second rechargeable batteries of the invention. By applying the negative electrode active material for use in the first and second batteries, the negative active material properties thereof are hardly deteriorated even when using methodology for fabricating rechargeable batteries by sintering together several battery element precursors. This ensures that resultant products offer excellent battery characteristics.

(1) First Rechargeable Battery

In the first rechargeable battery, the negative active material for use as the negative active layer 6 is made of a metallic lithium or lithium alloy. The lithium alloy may be an alloy of lithium and at least one selected from the group consisting of Sn, In and Zn. This alloy is preferable since this is large in current capacity, thus enabling thinning or "slimming" of resultant battery structures while at the same time suppressing creation of stresses at interfaces. Typical examples of such alloy composition are $Li_{4.4}Sn$, LiIn, LiZn and equivalents thereof. In particular, $Li_{4.4}Sn$ is desirable as it has a high capacity and is capable of being made thinner.

The negative active layer 6 made of the metal lithium or the lithium alloy is formable by segregation in an initial charge-up event after the assembly of a rechargeable battery. In case the conductive metal oxide making up the negative current collector layer 7 is a material that reacts with lithium ions as released from either the positive active layer 4 or the inorganic solid electrolyte layer 3 (e.g., tin oxides, indium oxides, zinc oxides, etc.), a layer of lithium alloy which ultimately becomes the negative active layer 6 is formed between the inorganic solid electrolyte layer 3 and the negative collector layer 7. Alternatively, in case the conductive metal oxide making up the negative collector layer 7 is a material that hardly reacts with lithium ions released from the positive electrode (e.g., titanium oxides), a metal lithium layer that becomes the negative active layer 6 is formed between the inorganic solid electrolyte layer 3 and negative collector layer 7. The negative active layer 6 to be formed by such chargeup in this way comes with the formation of a good interface, which is rich in attachability or adhesivity with its neighboring membrane, such as the inorganic solid electrolyte layer 3 or the negative collector layer 7. This makes it possible to manufacture excellent batteries less in interface resistance.

(2) Second Rechargeable Battery

The negative active material used for the negative active layer 6 in the second rechargeable battery is the specific one that an operation voltage potential of the negative electrode 2 becomes more noble than 1.0V with respect to the potential of the metal lithium. The conductive metal oxide used for the negative collector layer 7 is less than or equal to 1.0V in potential for intercalation and desorption of lithium ions. Accordingly, the conductive metal oxide of negative collector layer 7 no longer behaves to react with lithium ions at the potential whereat the lithium-ion intercalation/desorption progresses in the negative active layer 6. This ensures that the reaction of the conductive metal oxide of collector layer 7 hardly impedes electrode reactions of the negative active material per se. This would result in improvement of battery cycle life, when compared to the first battery stated above.

Desirably, the negative active material used here is a carefully chosen material that permits the negative electrode's operation voltage potential to be more noble than 1.0V with respect to the metal lithium's potential, while at the same time having electrical conductivity and being high in reversibility of lithium-ion intercalation/desorption reactions, and further stays less in volume change upon absorption/storage and release of lithium ions and also does not significantly change in quality due to heat application. Some major examples of the material are metal oxides and metal sulfides, such as tungsten oxides (for example, $WO_a$, where $1.8<a<2.2$, with the negative electrode operation potential ranging from 1.0 to 1.4V), molybdenum oxides (e.g., $MoO_b$, where $1.8<b<2.2$, and the negative electrode operation potential of 1.0 to 1.4V), iron sulfides (e.g., $Fe_cS$ where $0.9<c<1.1$ and the negative electrode operation potential of approximately 1.8V), lithium iron sulfides ($Li_xFeS_y$ where $0 \leq x \leq 4.0$ and $0.9 \leq y \leq 2.1$ with the negative electrode operation potential of about 1.8V), titanium sulfides (e.g., $TiS_d$ where $1.8<b<2.2$ and the negative electrode operation potential of 1.5 to 2.7V), and lithium titanates (e.g., $Li_{4+z}Ti_5O_{12}$ where $0 \leq z \leq 3$ and the negative electrode operation potential of about 1.55V). These are employable in sole or in combination of more than two of them. In particular, it is desirable to use composite sulfides which contain therein both lithium and iron or use composite oxides containing lithium and titanium. More desirably, an iron sulfide represented by $Li_xFeS_y$ ($0 \leq x \leq 4$, $0.9 \leq y \leq 2.1$) with the negative electrode operation potential of about 1.8V or a lithium titanate of the type having the spinel structure defined by the chemical formula $Li_{4+x}TiSO_{12}$ ($0 \leq x \leq 3$) with the negative electrode operation potential of about 1.55V is used, because such is great in lithium-ion absorption/storage amount and thus enables achievement of increased battery capacity.

As apparent from the foregoing, it is possible by using the arrangements of the first and second rechargeable batteries to employ fabrication processes for sintering together the positive and negative electrodes and the inorganic solid electrolyte. Thus it is possible to complete the intended inorganic solid electrolyte rechargeable battery by the following simplified process, by way of example.

Figure 2:
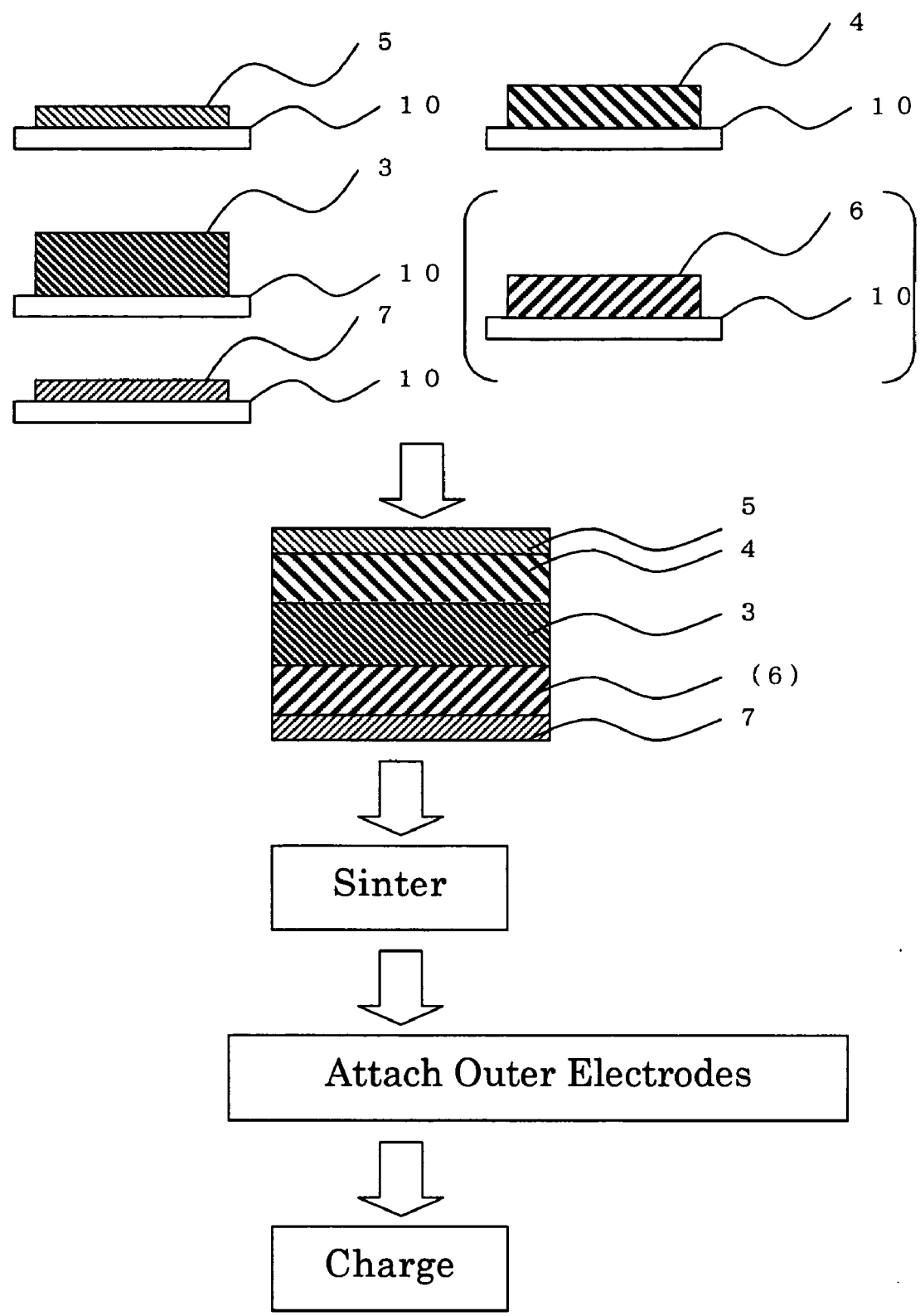
FIG. 2 illustrates, partly in cross-section, some major process steps of a rechargeable battery fabrication method also embodying the invention.

An explanation will next be given of a method of fabricating the first and second rechargeable batteries with reference to FIG. 2. FIG. 2 is a diagram which illustrates, in schematic cross-section, some major steps of the rechargeable battery fabrication process.

As shown in FIG. 2, prepare on carrier sheets 10 an inorganic solid electrolyte layer 3, a positive active layer 4, a positive collector layer 5, a negative electrode-use active layer 6 and a negative current collector layer 7, respectively as an example. Note here that in the case of a rechargeable battery of the type having its negative active material layer to be formed through segregation by initial chargeup at a later step, it is unnecessary to prepare in advance the negative active layer 6.

The formation of each layer can be performed in a way which follows: use screen print or doctor blade techniques to deposit a slurry on the carrier sheet to a required thickness, wherein the slurry comprises a constituent material of each member as blended and admixed with a binder (for example, polyvinyliden fluoride, stylene butadiene rubber or the like) and a solvent (e.g., N-methyl pyrrolidone, water or else); and, thereafter, remove the carrier sheet. Desirably, those materials that behave to form an electrically insulative layer due to oxidization are prevented from being contained in the positive collector layer 5 and negative active layer 6 made of conductive metal oxides and from being coated on the surfaces of these layers.

As far as the materials making up respective layers are mutually insoluble, a plurality of members may be laminated together in combination on the same carrier sheet; for example, the positive active layer 4 and positive collector layer 5 are formed by sequentially stacking them on the same carrier sheet. It is also possible to sequentially laminate by screen print techniques all members of the positive active layer 4, positive collector layer 5, negative active layer 6 (this is unnecessary in case this layer is formed by the initial chargeup), negative collector layer 7 and inorganic solid electrolyte layer 3 while letting them be in the state of the slurry stated supra.

Then, remove the carrier sheet from each dehydrated layer. Next, form a battery component precursor by laminating the layers in such a manner that the inorganic solid electrolyte layer 3 is interposed between the positive active layer 4 and negative active layer 6 while causing the positive collector layer 5 to be positioned outside of the positive active layer 4 and also letting the negative collector layer 7 be placed outside of the negative active layer 6. At this time, it is desirable that the process be done while thermal compression is applied thereto. Next, put the resulting battery element precursor in a certain jig for unification of respective layers, followed by execution of hydrostatic pressure processing. Thereafter, perform dicing machining.

Furthermore, this battery element precursor is subjected to high-temperature sintering at temperatures greater than or equal to 500° C. and yet less than or equal to 1500° C.; preferably, at temperatures ranging from 700 to 900° C. Regarding an atmosphere during sintering, the sintering is done in an oxidizable atmosphere in view of the fact that oxides are used as the layer material. A typical example of it is an oxygen-containing atmosphere. Although it is the simplest way to do it in ambient atmospheres, similar results are also obtainable when the above process is carried out while adjusting various kinds of atmospheres in order to adjust of oxidation and reduction (i.e., redox) reactions in a way depending upon the material used. Preferably, a time period for the sintering is set to fall within a range of from 0.1 to 10 hours.

Then, attach outer electrodes 8 and 9 for connection to the positive and negative collector layers 5 and 7, respectively. Next, adhere metallic terminals to outer electrodes 8-9 by welding techniques using electrically conductive paste or else, followed by dehydration thereof. Thereafter, the resultant structure is coated by dipping with an outer sheath or "shell" due to resin coating and is then hardened, thereby to complete the rechargeable battery.

Additionally, in case the negative active layer 6 is formed by the initial chargeup, a charging process is performed thereafter so that the negative active layer 6 is segregated between the solid electrolyte layer 3 and negative collector layer 7.

EXAMPLES

Example 1

A rechargeable battery, also called secondary battery, was prepared by a method having the steps which follow. The battery has a unitary laminate structure such as shown in FIG. 1. Some major process steps in the manufacture of such battery are illustrated in cross-section in FIG. 2.

<Forming Inorganic Solid Electrolyte Layer>

A slurry was prepared by admixture and blend of chosen inorganic solid electrolytic materials into N-methylpyrrolidone (NMP), which are 95 weight percent (wt %) of lantern lithium titanate ($Li_xLa_yTiO_3$) powder and 5 wt % of polyvinyliden fluoride (PVdF). Then, deposit this slurry on a carrier sheet 10, followed by dehydration. This resulted in an inorganic solid electrolyte layer 3 being formed on the carrier sheet 10.

<Forming Positive/Negative Electrolyte Layers>

A slurry was prepared by mixture and blend of 95 wt % of antimony-doped tin oxide ($SnO_2$) powder and 5 wt % of polyvinyliden fluoride (PVdF) into N-methylpyrrolidone (NMP). Deposit this slurry on carrier sheets 10, and then dry it, resulting in a positive current collector layer 5 and a negative collector layer 7 being formed on the carrier sheets 10, respectively.

<Forming Positive Active Layer>

A slurry was prepared by mixture and blend of 95 wt % of lithium cobalt oxide ($LiCoO_2$) powder and 5 wt % of PVdF into NMP. Deposit this slurry on a carrier sheet 10, and then dry it, resulting in a positive active layer 4 being formed on carrier sheet 10.

Let the positive collector layer 5, positive active layer 4, inorganic solid electrolyte layer 3 and negative active layer 6 made of these constituent members be sequentially laminated to thereby form a battery element precursor, which was then sintered in an oxygen gas flow at 900° C. for 1 hour.

After having attached outer electrodes 8-9 for connection to the resultant battery element's positive and negative collector layers 5 and 7 respectively, electrically charge it up to 4.1V. Thus, an inorganic solid electrolyte secondary battery was completed.

The battery completed is then cut or diced vertically relative to its lamination faces. Then, scanning electron microscopy (SEM) and associated energy dispersive X-ray (EDX) analysis and X-ray diffraction (XRD) analysis were performed. Results of this analyzation well demonstrated the presence of a layer or membrane of Li—Sn alloy for use as the negative active layer 6 between the negative collector sheet 7 and the inorganic solid electrolyte layer 3.

Example 2

A battery was formed, which is similar to that of Example 1 except that its positive and negative current collector layers are made of an indium oxide ($In_2O_3$)

The battery completed is then trimmed or diced vertically relative to its laminate faces. As a result of execution of SEM-EDX analysis and XRD analysis, there was affirmed the presence of a Li—In alloy layer for use as the negative active layer 6 between the negative collector sheet 7 and the inorganic solid electrolyte layer 3.

Example 3

A battery was formed, which is similar to that of Example 1 except that its positive and negative collector layers are made of zinc oxide (ZnO).

The battery completed is then diced vertically relative to its laminate faces. Then, SEM-EDX analysis and XRD analysis were done to affirm the presence of a Li—Zn alloy layer for use as the negative active layer 6 between the negative collector sheet 7 and inorganic solid electrolyte layer 3.

Example 4

A battery was formed, which is similar to that of Example 1 except that its positive and negative collector layers are made of niobium-doped titanium oxide ($TiO_2$).

The battery completed is diced vertically relative to its laminate faces. Then, SEM-EDX and XRD analyses were done to affirm the presence of a Li metal layer between the negative collector layer and inorganic solid electrolyte layer.

Example 5

By using a positive collector layer 5, positive active layer 4, inorganic solid electrolyte layer 3 and negative collector layer 7 which are similar to those of Example 1 and also using as the negative active layer 6 a membrane that was formed in a way as described below, sequentially laminate the positive collector layer 5, positive active layer 4, inorganic solid electrolyte layer 3, negative active layer 6 and negative collector layer 7 to thereby form a battery element precursor. Let this precursor be sintered in the flow of an oxygen gas at 900° C. for 1 hour.

After having attached outer electrodes 8-9 for connection to the resultant battery element's positive and negative collector layers 5 and 7 respectively, charge it up to 2.8V, resulting in completion of an inorganic solid electrolyte secondary battery.

<Forming Negative Active Layer>

A slurry was prepared by mixture and blend of chosen negative active materials, such as 95 wt % of lithium titanate ($Li_4Ti_5O_{12}$) powder and 5 wt % of PVdF into NMP. Then, deposit this slurry into a sheet-like shape, followed by dehydration.

Example 6

A battery was formed, which is similar to that of Example 5 except that its positive and negative collector layers are made of indium oxide ($In_2O_3$).

Example 7

A battery was formed, which is similar to that of Example 5 except that its positive and negative collector layers are made of zinc oxide (ZnO).

Example 8

A battery was formed, which is similar to that of Example 5 except that its positive and negative collector layers are made of niobium-doped titanium oxide ($TiO_2$).

Example 9

A battery was formed, which is similar to Example 5 except that iron sulfide (FeS) is used as its negative active material.

Example 10

A battery was formed, which is similar to Example 5 except that titanium sulfide ($TiS_2$) is used as its negative active material.

Example 11

A battery was formed, which is similar to Example 5 except that tungsten oxide ($WO_2$) is used as its negative active material.

Comparative Example 1

A battery was formed, which is similar to Example 1 except for the following arrangements. A negative active layer 6 was formed on a carrier sheet 10 while using a foil of aluminum for its positive collector layer 5 and also using a copper foil as a negative collector layer 7 and further using black lead or graphite as its negative active material, resulting in formation of a battery element precursor. Thereafter, sintering is applied thereto, thus forming the negative active layer 6.

Comparative Example 2

A battery was formed, which is similar to Example 1 except for the following: a negative active layer 6 was formed while using an aluminum foil for the positive collector layer 5 and also using a copper foil as the negative collector layer 7 and further using graphite as the negative active material, resulting in formation of a battery element precursor. Thereafter, sintering was done in an argon atmosphere, thus forming the negative active layer 6.

Comparative Example 3

A battery was formed, which is similar to Example 1 except for the following: a negative active layer 6 was formed on a carrier sheet 10 while using graphite as the negative active material, resulting in formation of a battery element precursor, which was then subject to sintering, resulting in formation of the negative active layer 6.

Comparative Example 4

A battery was formed, which is similar to Example 1 except that its negative collector layer 7 is made of graphite, which was applied sintering in an argon atmosphere.

Comparative Example 5

A battery was formed, which is similar to Example 1 except that its positive collector layer 5 is made of an aluminum foil whereas its negative collector layer 7 is made of a copper foil.

Measurement results of battery capacity values of Examples 1 to 11 and Comparative Examples 1-5 thus completed in the way stated above are indicated in Table 1. As the positive active materials for use in respective batteries are substantially the same both in kind and in deposition amount, the resulting battery capacities are expected to have the same value. However, it has been revealed that Comparative Examples 1-4 are extremely less in battery capacity than Example 1.

Capacity-measured batteries were then disassembled for analysis purposes, revealing the fact that the battery of Comparative Example 1 is such that various different kinds of quality-deteriorated layers were formed due to oxidation of the graphite for use as the current collector and negative active material. It is very likely that this poor-quality layer creation has lowered the battery characteristics.

Regarding the battery of Comparative Example 2, such oxidation of the graphite used for its current collector and negative active material was suppressed and reduced; however, it was found that the lithium cobaltate used for the positive active material decreases in crystallinity. It is considered that this crystallinity decrease is due to execution of the sintering in the reducible atmosphere, which in turn causes degradation of the battery properties.

As for the battery of Comparative Example 3, it was observed that the graphite for use as its negative active material was oxidized in a similar way to that of Comparative Example 1. In the battery of Comparative Example 4, its positive active material appreciably decreases in crystallinity as in Comparative Example 2. In the both cases, the battery performance is degraded.

In the battery of Comparative Example 5, it was affirmed that the aluminum and copper used for its current collectors were oxidized, which caused the collapse of collector layers, resulting in a decrease in battery performance.

Additionally, measurement results of charge/discharge cycle life for the batteries of Examples 1-11 are also presented in Table 1 below. Cycle life testing was done at 20° C. while letting charge and discharge currents be set to 1C. Regarding the batteries of Examples 1-4, a charging time period was set to 3 hours, with charge and discharge endpoint voltages being set at 4.1V and 3V, respectively. With such value settings, charge/discharge cycles were repeated to thereby measure resultant capacity retain factors. In regard to the batteries of Examples 5-11, their capacity retain rates were measured by repeated execution of charge/discharge cycles while setting the charge time to 3 hours, the charge end voltage to 2.8V, and the discharge end voltage to 1.5V.

TABLE 1

| | Cell Capacity (μAh) | Capacity Retainability After 500 Cycles (%) |
|---|---|---|
| Example 1 | 100 | 78 |
| Example 2 | 100 | 72 |
| Example 3 | 100 | 70 |
| Example 4 | 100 | 65 |
| Example 5 | 100 | 98 |
| Example 6 | 100 | 96 |
| Example 7 | 100 | 95 |
| Example 8 | 100 | 97 |
| Example 9 | 100 | 88 |
| Example 10 | 100 | 85 |
| Example 11 | 100 | 80 |
| Comparative Example 1 | 5 | — |
| Comparative Example 2 | 20 | — |
| Comparative Example 3 | 10 | — |
| Comparative Example 4 | 30 | — |
| Comparative Example 5 | 10 | — |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of making a rechargeable battery comprising:
   forming a multilayer structure having a positive collector layer, a positive active material layer, a lithium-containing inorganic solid electrolyte layer and a negative collector layer;
   sintering said multilayer structure in an oxidizable atmosphere; and
   charging, after the sintering, of said multilayer structure to create between said negative collector layer and said inorganic solid electrolyte layer, a negative active material layer made of any one of a metallic lithium and a lithium alloy,
   wherein at least one of said positive collector layer and said negative collector layer comprises a conductive metal oxide.

2. The method according to claim 1, wherein said conductive metal oxide is an oxide of at least one kind of element as selected from the group consisting of Sn, In, Zn and Ti.

3. The method according to claim 2, wherein said conductive metal oxide is at least one selected from the group consisting of $SnO_2$, $In_2O_3$, ZnO, and $TiO_x$ wherein x is equal to or greater than 0.5 and equal to or less than 2.

4. The method according to claim 3, wherein said lithium alloy comprises lithium and at least one element selected from the group consisting of Sn, In and Zn.

5. The method according to claim 1, wherein said positive collector layer and said negative collector layer comprise the conductive metal oxide.

6. A method for making a rechargeable battery comprising:
forming a multilayer structure having a positive collector layer, a positive active material layer, a lithium-containing inorganic solid electrolyte layer, a negative active material layer and a negative collector layer, said negative active material layer comprising a negative active material with an operation voltage potential of a negative electrode becoming more noble than 1.0V with respect to a potential of metallic lithium; and
sintering said multilayer structure in an oxidizable atmosphere,
wherein at least one of said positive collector layer and said negative collector layer comprises a conductive metal oxide.

7. The method according to claim 6, wherein said conductive metal oxide is an oxide of at least one kind of element as selected from the group consisting of Sn, In, Zn and Ti.

8. The method according to claim 7, wherein said conductive metal oxide is at least one selected from the group consisting of $SnO_2$, $In_2O_3$, ZnO and $TiO_x$ wherein x is equal to or greater than 0.5 and equal to or less than 2.

9. The method according to claim 6, wherein the negative active material causing the negative operation voltage potential to become more noble than 1.0V with respect to the metallic lithium potential is at least one selected from the group consisting of tungsten oxide, molybdenum oxide, iron sulfide, lithium iron sulfide, titanium sulfide and lithium titanate.

10. The method according to claim 6, wherein said positive collector layer and said negative collector layer comprise the conductive metal oxide.

* * * * *